United States Patent [19]
Grewell

[11] Patent Number: 5,772,814
[45] Date of Patent: Jun. 30, 1998

[54] WELDING SYSTEM AND METHOD OF SETTING WELDING MACHINE PARAMETERS

[75] Inventor: David A. Grewell, Waterbury, Conn.

[73] Assignee: Branson Ultrasonic Corporation, Danbury, Conn.

[21] Appl. No.: 592,768

[22] Filed: Jan. 26, 1996

[51] Int. Cl.[6] .................................................. B32B 31/00
[52] U.S. Cl. ........................... 156/64; 156/73.4; 156/351; 156/358; 156/378; 156/580.1; 364/477.06
[58] Field of Search ........................... 156/64, 73.1, 73.4, 156/350, 351, 358, 378, 580.1; 264/406; 228/9; 364/477.06

[56] References Cited

U.S. PATENT DOCUMENTS

| | | | |
|---|---|---|---|
| 4,341,574 | 7/1982 | Landes | 156/64 |
| 4,373,653 | 2/1983 | Salzer et al. | 156/378 X |
| 4,606,490 | 8/1986 | Chan et al. | 364/477.06 X |
| 4,631,685 | 12/1986 | Peter | 364/477.06 |
| 4,696,708 | 9/1987 | Keller et al. | 156/64 |
| 4,806,193 | 2/1989 | Von Raben et al. | 156/378 |
| 4,874,444 | 10/1989 | Satuo et al. | 156/64 |
| 4,973,876 | 11/1990 | Roberts | 310/316 |
| 5,110,381 | 5/1992 | Heckard et al. | 156/64 |
| 5,170,929 | 12/1992 | Long et al. | 156/378 X |
| 5,225,025 | 7/1993 | Lambing et al. | 156/358 |
| 5,357,423 | 10/1994 | Weaver et al. | 364/477.06 X |
| 5,435,863 | 7/1995 | Frantz | 156/64 |

OTHER PUBLICATIONS

*Intelligent Knowledge Based System for Electrofusion Welding of Polyethylene Pipes*; Plastic, Rubber and Composites Processing and Applications, vol. 25, No. 4, 1996.

Primary Examiner—David A. Simmons
Assistant Examiner—Paul M. Rivard
Attorney, Agent, or Firm—Polster, Lieder, Woodruff & Lucchesi, L.C.

[57] ABSTRACT

An expert system for a welding machine has an installed knowledge base concerning weld problems and preferred solutions. Trial welds are made from which input data concerning weld quality is obtained. The expert system applies predetermined rules and historic confidence levels to determine changes in weld parameters to attempt to correct any weld defects.

55 Claims, 2 Drawing Sheets

WELDING SYSTEM AND METHOD OF SETTING WELDING MACHINE PARAMETERS

BRIEF SUMMARY OF THE INVENTION

This invention relates to welding systems and more particularly to a system which sets welding parameters for particular welding operations in an interactive manner to improve weld quality. Although the invention is described in terms of ultrasonic welding and particularly refers to ultrasonic welding of thermoplastics, it should be understood that it is equally applicable to other types of welding.

It is well known that welding is used for bonding, sealing or otherwise connecting sheets or rigid workpieces made of various materials. For example, thermoplastic film and fabric materials, as well as substantially rigid workpieces, may be secured together by ultrasonic welding. Individual welding machines may be used on a variety of different materials, and to perform a variety of different welding operations. Consequently, the controllable parameters for the welding machine may vary significantly from job to job.

Heretofore, the welding machine parameters have been varied by the human user in a series of trial runs, in an attempt to obtain a satisfactory weld. Such a procedure works well only for highly experienced users facing problems which they have encountered before. Less experienced users, or users faced with new weld problems, using such a procedure may in fact make the weld problem worse rather than better. In general, the parameter adjustment procedure controlled by a human user in not necessarily efficient and can be counter-productive.

Welding thermoplastic workpieces and plunge sealing film and fabric materials by sonic or ultrasonic energy is well known. Generally, the workpiece is supported on an anvil. An electroacoustic transducer is coupled to a horn (dimensioned to be resonant for high frequency vibrations of predetermined frequency) is brought into forced engagement with the workpiece for a fixed time interval or an interval which may be determined by process variables such as energy transfer or horn travel distance (referred to as a weld or work cycle) and, responsive to the horn being rendered resonant, sonic energy is transmitted to the workpiece for causing a softening and flowing of thermoplastic material of the workpiece. Upon the cessation of the flow of sonic energy, the softened and flowed material rigidifies, thereby establishing a bond or a weld. As used in this disclosure, the terms "sonic" and "ultrasonic" are used interchangeably and these terms refer to vibrations having a frequency ranging generally between about 10 KHz to about 100 KHz, and more preferably between about 15 KHz and about 40 KHz.

Generally, it is recognized that the ultrasonic (or sonic) power transmitted to the workpieces is dependent on four parameters, namely, the frequency of the electroacoustic transducer, the force or clamping pressures applied to the workpieces by the horn, the motional amplitude of the horn as it transmits the energy to the workpieces and the duration of the energy transfer. It will be appreciated that there are other parameters which can affect an ultrasonic weld as well. For example, the trigger force (the force between the horn and the workpiece below which no ultrasonic energy is initially applied), the feed or down speed of the horn, and the time during which power is increased or decreased may also affect the weld.

In the context of ultrasonic welding, the present invention may be incorporated into systems such as those shown in U.S. Pat. No. 4,973,876 issued to A. J. Roberts, dated Nov. 27, 1990, entitled "Ultrasonic Power Supply", and U.S. Pat. No. 4,631,685 dated Dec. 23, 1986 issued to D. A. Peter, entitled "Method and Apparatus for Ultrasonic Plastic Forming and Joining", which patents are specifically incorporated herein by reference. The details of such machines may be varied as required by the particular application at hand.

SUMMARY OF THE INVENTION

In the present invention, it has been discovered that weld parameters may be advantageously set by using an interactive approach in which the weld machine controller provided with the machine sets initial weld parameters, then obtains input as to the resulting weld quality (including the identity and severity of any problems), and then uses this information to set new weld parameters to subsequently improve weld quality. This is accomplished by providing the human user with a list of possible choices, from which a selection is made. The controller in response to the input concerning weld quality changes one of the welding parameters (based upon a stored knowledge base and the particular weld quality encountered) and instructs the user to perform another trial weld. This interactive procedure is advantageously repeated until the weld is acceptable or until no change appears likely to lead to an acceptable weld. In making parameter changes from trial weld to trial weld, it has been discovered that it is useful to take into account the results of all previous trials, which the controller uses to adjust a historical confidence level for the particular parameter(s) involved. Alternatively, instead of changing one welding parameter at a time, the controller may be programmed to change a number of parameters for each trial, based upon a weighting system which takes into account either a plurality of problems or a plurality of solutions, or both.

One of the objects of this invention is, therefore, the provision of an improved system for welding which automates the procedure for setting weld parameters for a particular weld operation (sometimes called a weld run).

Another object is the provision of such a system which substantially eliminates human guesswork in the setting of weld parameters.

A third object is the provision of such a system which learns from the results of previous trial welds.

A fourth object is the provision of such a system which reduces decision making by the human user.

Other objects and features will be in part apparent and in part pointed out hereinafter.

Briefly, a welding system of the present invention includes a welding machine having a plurality of controllable parameters, a controller for controlling the controllable parameters of the welding machine, an interface responsive to the controller for communicating controller messages to a human user of the welding machine, and an input device, operable by the user, for supplying responses from the user to the controller. The welding system has an operating mode in which the controllable parameters have a set of values for a particular welding operation, and has a setup mode in which the controller determines the set of values of the controllable parameters for that particular welding operation by interactively determining from the user via the interface and the input device the results of at least one trial of the particular welding operation.

A second aspect of the present invention is a method of setting parameters for a welding operation on a welding machine including the steps of providing identifying information concerning the welding operation to an electronic controller coupled to the welding machine, with the controller setting initial parameter values based upon the welding operation identifying information, performing a trial welding operation using the initial parameter values, and providing weld quality information from the trial welding operation to the controller. The controller is responsive to the weld quality information to change the initial parameter values for a subsequent trial welding operation. Weld quality information from the trial welding operation using the changed parameter values is provided to the controller and the controller is responsive to the latter weld quality information to further change the parameter values based in part on the weld quality information from all previous trial welding operations.

BRIEF DESCRIPTION OF THE DRAWINGS

Corresponding reference characters indicate corresponding parts throughout the several views of the drawings.

DESCRIPTION OF PREFERRED EMBODIMENTS

Figure 1:
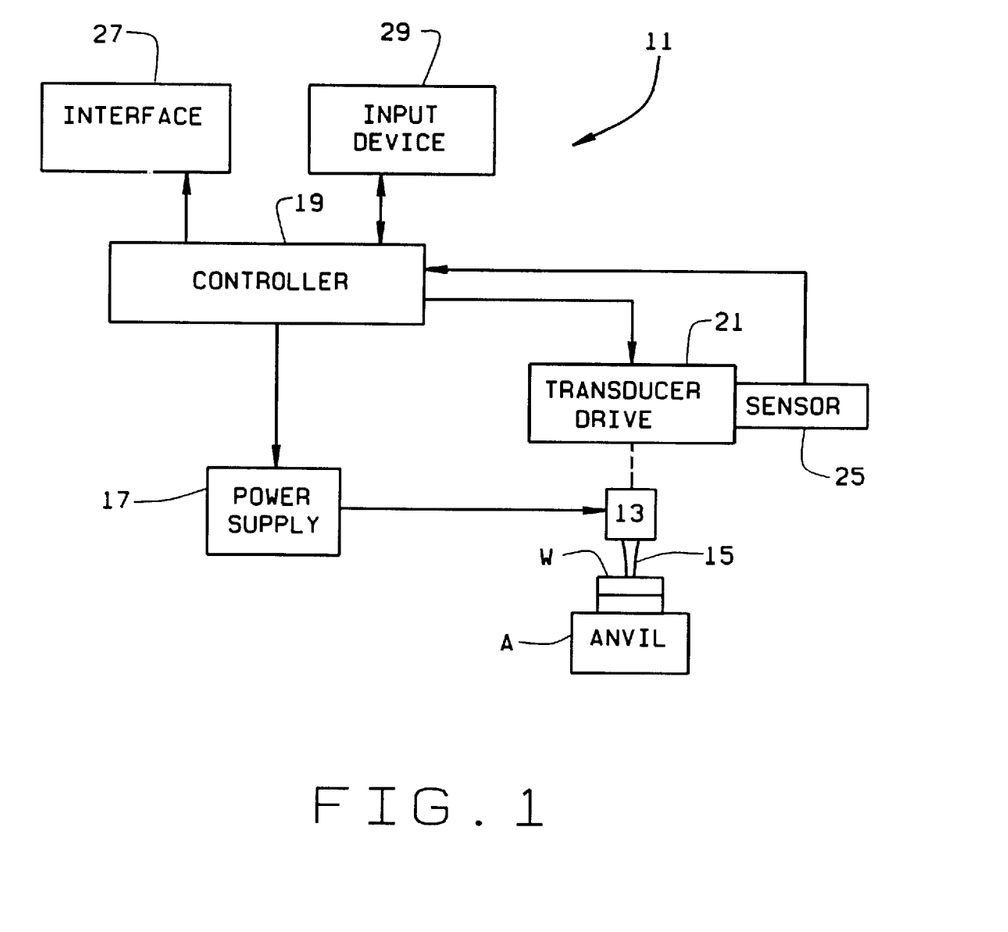
FIG. 1 is a block schematic of an illustrative welding machine using the present invention.

FIG. 1 illustrates a system 11 of the present invention, particularly in the context of an ultrasonic welding apparatus, although the present invention is not limited to such apparatus and in its broader aspects is directed to joining machines or systems in general such as ultrasonic welding machines, vibration welding machines, hot plate welding machines, hot gas welding machines, infrared welding machines, induction welding machines, microwave welding machines, laser welding machines for plastics, and machines for performing various non-welding, joining operations. It is intended that the present system be usable with either thermoplastic or non-thermoplastic workpieces.

Joining system 11 includes a transducer 13 which is connected to a horn 15 adapted to be resonant so as to apply ultrasonic energy to a workpiece(s) W disposed on an anvil A. Controlled power is supplied to transducer 13 from a power supply 17, which is under control of a controller 19. Controller 19 also controls a conventional drive 21 which controls the pressure applied from the horn to the workpiece. A set of sensors 25 of conventional design are provided to supply to the controller data such as gauge pressure. Several types of such sensors are known in the art. Alternatively, other control parameters such as distance or a servo drive could be used instead.

The controller is also connected to an interface device 27 such as a display by means of which the controller can communicate messages to the human user (not shown). Conversely, a manually operable input device 29 such as a keyboard, mouse, touch sensitive display or light pen, is provided for supplying user responsive input data to the controller.

The particular construction of these various elements may be as shown in the above-mentioned patents or are otherwise well-known. Of course, for non-ultrasonic welding, the various components will change depending upon the particular type of welding involved.

Figure 2:
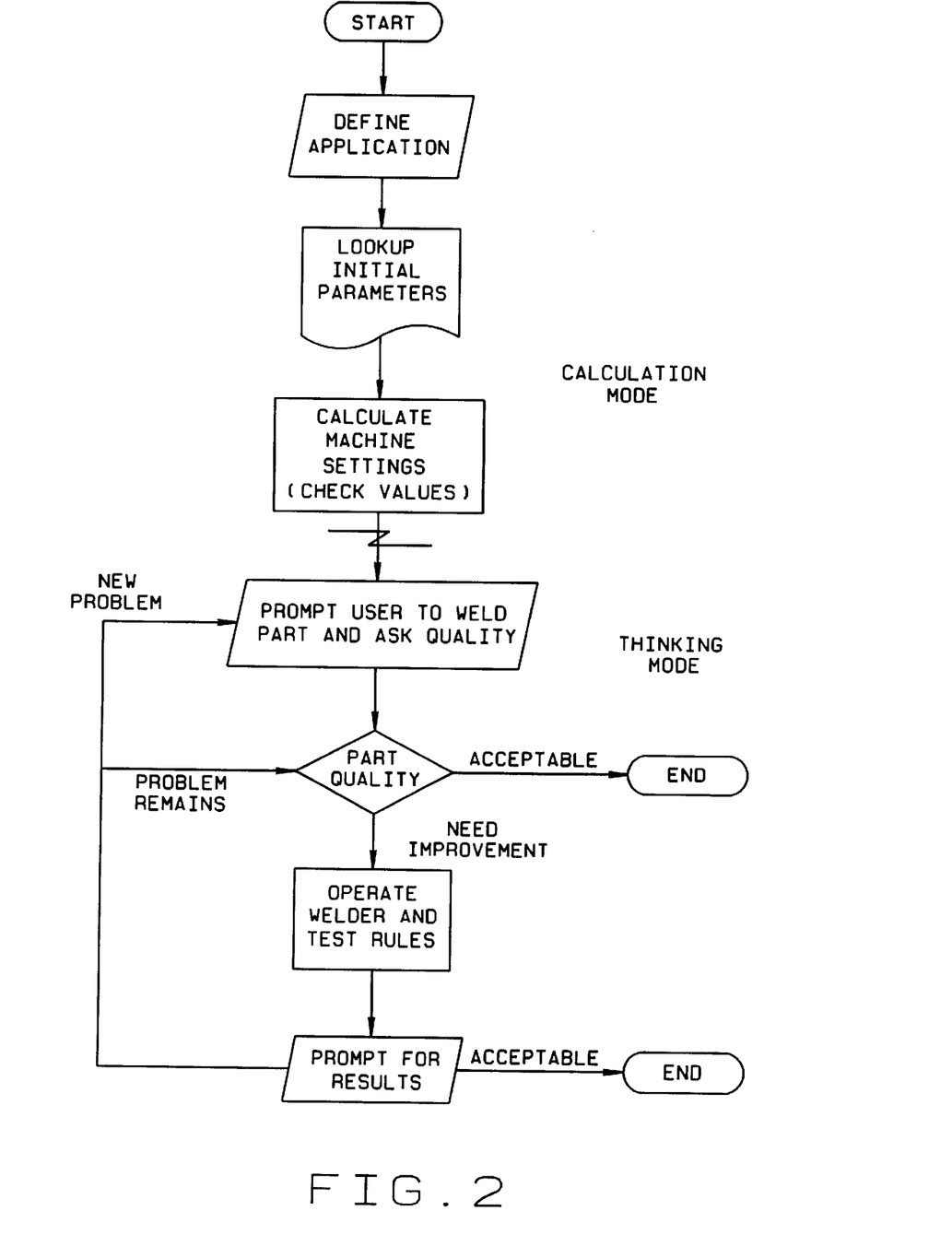
FIG. 2 is a flow-chart for the parameter setting part of the system of the present invention.

The present invention particularly concerns the controller 19 as programmed to accomplish the steps shown in the flowchart of FIG. 2. It should be understood that this particular flowchart applies only to the determination of welding parameters, and not to the general operation of the welding machine itself, which is otherwise well known. The present system lessens or eliminates the need that a user have a comprehensive knowledge of the welding machine or of the weld process in order to improve or optimize the weld parameters for achieving a satisfactory weld. Although the invention is described in terms of a setup mode of operation, it should be understood that this term is used herein in a broad sense to include not only what is traditionally referred to as setup for a particular welding operation, but also troubleshooting the application or the equipment. Of course, the particular steps/flowcharts involved in troubleshooting may vary somewhat from those used in what is traditionally referred to as "setup," but the general principle of this invention as applied in these instances is the same. In addition, although the present invention is described in terms of software embedded in the welding machine controller 19, it should be understood that the software could also be embedded in an external processor which would communicate with the welder. Although the particular software language used to provide such software is a matter of choice, applicant prefers the expert system shell software sold under the trade designation EXSYS by Exsys, Inc. of New Mexico.

Operation of the present invention is as follows:

Step 1

The first action item of the system of the present invention is to define the process or application, i.e., the particular type of welding operation to be performed. Such operations include, but are not limited to:

Compression weld with energy director

Shear joint

Insertion

Staking/Swaging

Spot welding

Film/fabric welding

This step includes a definition of the particular type of material (in ultrasonic welding, for example, the particular type of plastic) which is being joined. Step 1 is accomplished by the controller causing the display on interface 27 of a list such as that set forth above. The user then selects from the list the appropriate operation by using manually operable input device 29, which input is supplied to controller 19. Alternatively, the procedure described below may be used even when the workpiece material is unknown.

Step 2

Based on the information gained in Step 1, the controller prompts the user for further information about the desired welding operation. For example, if the application is a weld involving a compression joint with energy director, the controller uses display 27 to prompt the user to input the weld area and weld distance (near or far-field) using the input device. If the application is a staking application, the controller prompts the user to input the size and number of studs. Other applications require other input information. Moreover, if it is desired to modify the best guess (estimate) of parameters in response to user specified interest in particular weld properties or parameters, the controller will prompt the user to designate the particular weld property or parameter (such as weld quality, weld strength, or throughput) which is of most importance.

Step 3

The controller then prompts the user to input the type of welding equipment used. Alternatively, when controller 19 is dedicated to a particular welding machine, the identifying information for the type of welding equipment may be automatically loaded into the controller so that no user input is required. The equipment identifying information is used to define the capabilities of the equipment, such as power capacity, cylinder size or servo drive. Other information which is obtained in this task may include the mechanical amplitude gain of the output horn and maximum booster horn gain permissible in order not to exceed the maximum allowable stress to which the output horn is subjected during operation. This information, for example, prevents the controller from proposing a booster horn which could cause the output horn to crack, fail, or break.

Step 4

The information gained in steps 1–3 is used by controller 19 to estimate the initial welding parameters. This is primarily accomplished via look-up tables obtained from prior experience of human experts in the field of welding, or from prior experience of the present expert system. For example, if ABS is the plastic to be joined, a look up table stored in controller 19 indicates that 200 psi is the recommended weld pressure. Thus, if the weld area is 1.2 in$^2$ (7.7 cm$^2$), the weld force needs to be 240 lbs. (1068 newtons). If the welding equipment, as identified in step 3, has a 3 in. (7.6 cm) diameter air cylinder, the initial gauge pressure setting is 34 psi (234 kPa). The controller computes this type of estimate for all machine settings, including weld time, booster horn amplitude, trigger force, down speed, etc.

Step 5

Controller 19 then checks the initial machine parameters against limits of acceptable practice or machine capability. If an initial parameter is beyond a limit, it is set to the limit and usually another parameter is adjusted to compensate for the effects. For example, if the initial gauge pressure is estimated at 200 psi (1379 kPa) and the machine limit is 80 psi (552 kPa), controller 19 sets that parameter value to 80 psi (52 kPa) and the weld time parameter is increased by 250% (200/80), for example, to compensate for the deviation from the estimated initial parameters. It should be understood that parameters may not be linearly related as is assumed in this example.

Step 6

All initial machine parameters are saved, displayed and loaded automatically into the welder so as to perform a weld using those parameters. The operator/user is then prompted by controller 19 to weld/join a part using these initial (best guess) parameters. After the initial trial weld, the controller then prompts the user to input one quality feature which best characterizes the part as to its quality features. (Alternatively, as described below, the user may input multiple quality features with weighted values.) To accomplish the entry of the quality feature(s), the controller causes a list of quality features customized for each application to be displayed. Some of the quality features include:

Excessive flash

Excessive marking

Overwelded

Underwelded

Overload of power supply (automatically input if interfaced to welding system)

Variation from part to part

Acceptable part

Based on the application and the described quality problem, inputted by the user as described above, rules that simulate expert judgment and choices are tested each subsequent time and the welder is operated to set confidence levels on possible action items which might remedy the problem. For purposes of illustration, the confidence levels range from 0 to 100. For example, if the workpiece or part is underwelded, the action item "increase mode variable" (increase weld time) is given a confidence level of 100. These initial confidence levels are prestored in controller 19 and are preferably based upon the equipment manufacturer's knowledge of probable causes of various weld defects.

Step 7

Controller 19 ranks action items (possible parameter changes) in increasing order of corrective action and tries the highest ranking item first. However, for each action item there is a second confidence level which is evaluated before an action is actually tried. This confidence level is the real-time learning confidence level (also called historic confidence level). At the start of the program all these variables are set to zero. The variables are modified by controller 19 based on the effect which particular actions have on the trial welding operations. For example, if in a previous trial, the power supply overloaded, the action item "increase pressure" is decremented by 30. (Action items are initially given arbitrary weight values, such as 100 or 0. Decrementing by 30, therefore, reduces the weight value from the arbitrary value of 0 to the value of –30, making that action less likely to be tried.) Subsequently, when trying to solve other problems, such as an underweld, this action is less likely to be tried, since power applied to a workpiece is proportional to pressure.

Step 8

Controller 19 then modifies the weld parameters to solve the problem defined in step 7. (Preferably only one weld parameter is modified at a time. However, as described below multiple parameters may be modified at one time if desired.) Once the parameters are suitably modified, the controller signals the user to perform another trial weld. Once that weld is completed, controller 19 further prompts the user to input the effect of the modification. The possible inputs, which are preferably displayed for selection on display 27 include, but are not limited to:

All problems are remedied (save and exit system)

The problem is improved

The problem is worse

The problem is improved but a new problem exists

The problem is remedied but a new problem exists

The problem is unchanged.

Based on the inputted selection reflecting the effect of the modification of the parameters, controller 19 either repeats the modification, cancels the modification, increases the magnitude of the modification or clears all confidence levels and restarts at step 6, as appropriate. In addition, the real-time learning confidence levels are modified based on the above results. These historical confidence levels are not cleared (reset to zero) like the other confidence levels if the system restarts at step 6. In fact, the historical confidence levels are not cleared at any time in the process. This allows the history of the trials to be used for diagnosis and review. (Note that the present system may also use historical data taken in a series of test welds to address problems in the statistical distribution of errors.)

Step 9

The system continues to repeat steps 6–8 or step 8 (as appropriate) until all the problems are solved or no action items have a combined confidence level (primary+historical confidence level) greater than zero. If no action items have a combined action item greater than zero and problems still exist, controller 19 prompts the user to call the equipment manufacturer. If all the problems are solved, the controller 19 switches to operation mode and uses the set of parameters which resulted in the acceptable weld.

Another feature which controller 19 may use in determining the proper parameters for a particular welding operation is referred to as a frustration level. This level is calculated based on unusual cause and effect. For example, if the part is underwelded and increasing the weld time made the problem worse, the frustration level is incremented by a preset amount, such as five points. If desired, the frustration level may be used by controller 19 to increase the weighting of the real-time (historical) confidence as the system learns more about the application. Of course, if a simpler system is desired, the frustration level feature need not be used to modify the confidence levels.

The operation of system 11 is further illustrated by the following example:
Part information
The part being welded has energy director.
The part is made of ABS, which is a AMOR. material.
The weld area is 150 mm².
The weld configuration is Near-Field.
Equipment information
The equipment is 920MA/AES actuator.
It has a cylinder size of 4258 mm² (7.4 cm diameter)
YES it has autotune.
The maximum power capacity of the equipment is 2000 W.
The horn has a gain of 2.
Recommended welding conditions for the first trial are
Required horn output amplitude 40 μmpp.
Use a GREEN(1.0) colored booster horn to get this amplitude.
Set the controller to 115 mS.
Set gauge pressure to 124 kPA.
Use a trigger force setting of 102 N.
Use a down speed of 63.5 mm/S.
Set the power supply to the time mode.
   The weld quality feature is underweld.
   Thus far the following actions have been tried during the phase;
Increase mode variable.
This is trial number 1.
The frustration level is 0.
Recommended welding conditions for this weld are
Use a GREEN 1.0 colored booster horn.
Gauge pressure is 124 kPA.
Set controller to 125 mS.
Trigger force setting is 102 N.
Down speed is 63.5 mm/S.
Power supply is set to the time mode.
   The weld quality feature is underweld.
   Thus far the following actions have been tried during the phase;
Increase mode variable. Increase mode variable.
This is trial number 2.
The frustration level is 1.
Recommended welding conditions for this weld are
Use a GREEN 1.0 colored booster horn.
Gauge pressure is 124 kPA.
Set controller to 135 mS.
Trigger force setting is 102 N.
Down speed is 63.5 mm/S.
Power supply is set to the time mode.
   The weld quality feature is underweld.
   Thus far the following actions have been tried during the phase;
Increase mode variable. Increase mode variable. Increase mode variable.
This is trial number 3.
The frustration level is 2.
Recommended welding conditions for this weld are
Use a GREEN 1.0 colored booster horn.
Gauge pressure is 124 kPA.
Set controller to 145 mS.
Trigger force/setting is 102 N.
Down speed is 63.5 mm/S.
Power supply is set to the time mode.
Recommended welding conditions for the trial are
Required horn output amplitude 40 μm (peak to peak).
Use a GREEN 1.0 colored booster horn to get this amplitude.
Set the controller to 145 mS.
Set gauge pressure to 124 kPA.
Use a trigger force setting of 102 N.
Use a down speed of 63.5 mm/S.
Set the power supply to the time mode.
   The weld quality feature is part marking.
   Thus far the following actions have been tried:
Decrease mode variable.
This is trial number 4.
The frustration level is 4.
Recommended welding conditions for this weld were
Use a GREEN 1.0 colored booster horn.
Gauge pressure is 124 kPA.
Set controller to 130 mS.
Trigger force setting is 102 N.
Down speed is 63.5 mm/S.
Power supply is set to the time mode.
   The weld quality feature is part marking.
   Thus far the following actions have been tried:
Cancel previous change. Use booster horn with larger gain.
This is trial number 5.
The frustration level is 7.
Recommended welding conditions for this weld are
Use a GOLD 1.5 colored booster horn.
Gauge pressure is 124 kPA.
Set controller to 123 mS.
Trigger force setting is 102 N.
Down speed is 63.5 mm/S.
Power supply is set to the time mode.
Recommended welding conditions for the first trial are
Required horn output amplitude 40 μm (peak to peak).
Use a GOLD 1.5 colored booster horn to get this amplitude.
Set the controller to 123.25 mS.
Set gauge pressure to 124 kPA.
Use a trigger force setting of 102 N.
Use a down speed of 63.5 mm/S.
Set the power supply to the time mode.
   The weld quality feature is overweld/flash.
   Thus far the following actions have been tried:
Decrease mode variable.
This is trial number 6.
The frustration level is 9.
Recommended welding conditions for this weld are
Use a GOLD 1.5 colored booster horn.
Gauge pressure is 124 kPA.
Set controller to 110 mS.
Trigger force setting is 102 N.
Down speed is 63.5 mm/S.
Power supply is set to the time mode.
   The weld quality feature is overweld/flash.
   Thus far the following actions have been tried:
Decrease mode variable. Increase mode variable.
This is trial number 7.
The frustration level is 10.

Recommended welding conditions for this weld are
Use a GOLD 1.5 colored booster horn.
Gauge pressure is 124 kPA.
Set controller to 120 mS.
Trigger force setting is 102 N.
Down speed is 63.5 mm/S.
Power supply is set to the time mode.
　　The weld quality feature is overweld/flash.
　　Thus far the following actions have been tried:
Decrease mode variable. Increase mode variable. Increase mode variable.
This is trial number 8.
The frustration level is 11.
Recommended welding conditions for this weld were
Use a GOLD 1.5 colored booster horn.
Gauge pressure is 124 kPA.
Set controller to 130 mS.
Trigger force setting is 102 N.
Down speed is 63.5 mm/S.
Power supply is set to the time mode.

In the above description, the present invention is described as taking into account the most prominent problem after each trial weld, and attempts to correct that problem by changing one weld parameter per trial. The performance of system 11 may be improved, however, by a suitable weighting system. In this improved system, the problems are weighted, or the solutions are weighted, or both.

More particularly, when weighting of problems is used to improve system performance, the system prompts the user to identify various problems applicable to the weld. These problems are assigned weights by the user, reflecting the severity of the problems or their relative importance. Alternatively, the system can be programmed to provide preset weights to different problems and assign those weights when those problems occur.

With respect to the weighting of solutions, it should be understood that the system as described above has two confidence levels for every possible action(s): a predefined confidence level programmed by the equipment manufacturer, and a historic confidence level, modified during execution of the program. By weighting the two confidence levels differently, the performance of the present system can be improved. This weighting is controlled by the "frustration level" mentioned above in the example. The frustration level is a measure of the degree of agreement between the application and the suggested correction. For example, if the part is overwelded and decreasing the weld time made the workpiece weld worse, the frustration level is significantly increased. This increase is representative of the fact that the application is unusual and the standard rules-of-thumb do not apply. Thus, the higher the frustration level, the more the system relies on the historic confidence levels in a weighted system.

For example, after an initial trial (and all subsequent trials), the weighted system prompts the user to enter the weld conditions/defects and assign weights to them. Such an assignment might be

| Attribute | Points/Votes |
| --- | --- |
| Underwelded | 6 |
| Overwelded | 0 |
| Part marking | 4 |
| Startup overload | 0 |
| etc. | 0 |
| TOTAL | 10 |

In this example, the part is underwelded and has part marking. The total points always equals 10 or some other arbitrary value), so that the user is forced to decide which attribute is the most important one.

The system then uses preset rules to determine needed changes to the welding parameters. For example, such rules applicable to underwelding and part marking could be:
1. If the part is underwelded, increasing weld time is given a confidence level of 100.
2. If the part is underwelded, increasing booster horn amplitude is given a confidence level of 70.
3. If the-part has partmarking, decreasing the weld time is given a confidence level of 100.
4. If the-part has partmarking, increasing the booster horn amplitude is given a confidence level of 60.

Applying those rules to the weighted problems listed above, results in total confidence levels as calculated below:

| Rule | Action | Confidence Level |
| --- | --- | --- |
| 1 | Increase weld time | 6 × 100 = 600 (not normalized) |
| 2 | Increase booster horn amplitude | 6 × 70 = 420 (not normalized) |
| 3 | Decrease weld time | 4 × 100 = 400 (not normalized) |
| 4 | Increase booster horn amplitude | 4 × 60 = 240 (not normalized) |
| All | Increase weld time | 600/10 = 60% |
| All | Increase booster horn amplitude | 660/10 = 66% |
| All | Decrease weld time | 400/10 = 40% |

In this example, the system decides to "increase booster horn amplitude", since that action has the highest confidence level. The next action item would be "increase weld time."

If it is desired to also weight the solutions, the historic confidence levels and frustration levels must also be taken into account by the system. For example, if the frustration level is 15 points (for example, 15 out of a possible 100), and the historic confidence levels are:
　　Increase weld time −40%
　　Decrease weld time 30%
　　Increase amplitude −80%,
then the system calculates the actions as follows:

| Action | Predefined Conf. Level | Historic Conf. Level | Total |
| --- | --- | --- | --- |
| Increase weld time | 60% × .85 | −40% × .15 | 45% |
| Decrease weld time | 40% × .85 | 30% × .15 | 39% |
| Increase amplitude | 66% × .85 | −80% × .15 | 44% |

Using weighted solutions, therefore, the system first tries "increase weld time" since that has the highest total points.

While there have been described and illustrated certain preferred embodiments of the invention, it will be apparent to those skilled in the art that various further changes and modifications may be without departing from the principle and spirit of this invention, which shall be limited only by the scope of the appended claims.

What is claimed is:
1. A system for forming a joint comprising:
　　a joining machine having a plurality of controllable parameters;
　　a controller for controlling the controllable parameters of the joining machine;
　　an interface responsive to the controller for communicating controller messages to a user of the joining machine;
　　an input device, operable by the user, for supplying responses from the user to the controller;
　　said system having an operating mode in which the controllable parameters have a set of values for a particular joining operation, and having a setup mode in which the controller determines the set of values of the controllable parameters for that particular operation by interactively determining from the user via the interface and the input device the results of at least one trial of the particular joining operation, and automatically, from the user supplied responses concerning said at least one trial result, determining a new set of values of the controllable parameters that will probably improve weld quality.

2. The system as set forth in claim 1 wherein the controller has stored therein initial parameter values for a plurality of different joining operations, said controller determining to use the initial parameter values as the values for a particular joining operation responsive to the user signaling that a first trial using the initial parameter values resulted in an acceptable joint.

3. The system as set forth in claim 2 wherein the controller compares the initial parameter values for a particular joining operation against parameter limits for the machine, said controller changing the initial parameter values to values which fall within the parameter limits for the machine before the first trial.

4. The system as set forth in claim 3 wherein the parameter limits are stored in the controller.

5. The system as set forth in claim 4 wherein parameter limits for a plurality of machines are stored in the controller and the controller determines the identity of the particular machine and in response compares the corresponding parameter limits against the initial parameter values.

6. The system as set forth in claim 1 wherein the controller has stored therein a set of possible solutions for addressing unacceptable joining conditions, said controller in the setup mode being programmed to apply said set of possible solutions in a sequence in subsequent trials.

7. The system as set forth in claim 6 wherein the set of possible solutions are changes to controllable parameters.

8. The system as set forth in claim 7 wherein the controller is programmed to change only one controllable parameter per trial.

9. The system as set forth in claim 6 wherein the controller is responsive to results of previous trials to change the sequence of possible solutions in subsequent trials.

10. The system as set forth in claim 9 wherein the controller is responsive to an improved result which is still not acceptable in a trial to further change the controllable parameter which resulted in said improved result.

11. The system as set forth in claim 6 wherein the controller stores information concerning previous trials and uses said information in determining which possible solution to apply in each subsequent trial.

12. The system as set forth in claim 1 wherein the controller has stored therein a list of joint defects, said controller during the setup mode after each trial presenting said list to the user for selection, said controller being responsive to the user selected defects to change at least one controllable parameter to attempt to correct selected defects.

13. The system as set forth in claim 12 further including means for weighting said defects presented to the user for selection.

14. The system as set forth in claim 13 wherein the means for weighting includes manually operable means for inputting data representing the severity of a joint defect.

15. The system as set forth in claim 13 wherein the means for weighting includes preset weights for different joint defects.

16. The system as set forth in claim 13 wherein the system includes means for weighting solutions to the joint defects detected.

17. The system as set forth in claim 16 wherein the means for weighting solutions includes a predefined confidence level for each possible solution and a historical confidence level, said historical confidence level being modified during operation.

18. The system as set forth in claim 17 wherein the predefined confidence level and the historical confidence level are weighted unequally.

19. The system as set forth in claim 18 wherein the weighting of the historical confidence level is increased by the system in response to test weld results which do not follow predefined rules-of-thumb.

20. The system as set forth in claim 1 wherein the controller prompts the user to make a joint after each change in controllable parameters to test the effect of said change.

21. The system as set forth in claim 1 wherein the controller in the setup mode is programmed to continue changing the controllable parameters for subsequent trials until the joint is acceptable or no set of controllable parameters can be found which results in an acceptable joint.

22. The system as set forth in claim 21 wherein the controller messages include messages presenting possible defects to the user for selection, further including means for weighting said defects presented to the user for selection.

23. The system as set forth in claim 22 wherein the selected defect is a joint defect, and wherein the means for weighting includes manually operable means for inputting data representing the severity of a joint defect.

24. The system as set forth in claim 22 wherein the means for weighting includes preset weights for different joint defects.

25. The system as set forth in claim 24 wherein the controller has stored therein information based on results of previous trials and determines before each trial from said stored information whether a set of controllable parameters is available which could result in an acceptable joint.

26. The system as set forth in claim 22 wherein the system includes means for weighting solutions to the joint defects detected.

27. The system as set forth in claim 26 wherein the means for weighting solutions includes a predefined confidence level for each possible solution and a historical confidence level, said historical confidence level being modified during operation.

28. The system as set forth in claim 27 wherein the predefined confidence level and the historical confidence level are weighted unequally.

29. The system as set forth in claim 28 wherein the weighting of the historical confidence level is increased by the system in response to test weld results which do not follow predefined rules-of-thumb.

30. The system as set forth in claim 1 wherein the machine is a welder selected from the class consisting of an ultrasonic welder, a vibration welder, a hot plate welder, a hot gas welder, an infrared welder, an induction welder, and a microwave welder.

31. The system as set forth in claim 1 wherein at least some of the controllable parameters are weld time, weld energy, weld distance, weld collapse, trigger location, down speed, weld time, weld pressure, hold time, hold pressure, amplitude, ramp time, and trigger force, and the profiling of such parameters.

32. The system as set forth in claim 1 wherein the controller has stored therein controller messages which include user directions and requests for user information concerning weld quality.

33. The system as set forth in claim 1 wherein the joining operation is for joining thermoplastic materials.

34. The system as set forth in claim 1 wherein the joining operation is for joining non-thermoplastic materials.

35. The system as set forth in claim 1 wherein the joining operation is for melting a portion of a workpiece to facilitate its joining to a separate part.

36. The system as set forth in claim 35 further including the recording of a historical confidence level for particular solutions, and wherein the weighting of the historical confidence level is increased by the system in response to test weld results which do not follow predefined rules-of-thumb.

37. A method of setting parameters for a welding operation on a welding machine comprising, the steps of:
   a) providing identifying information concerning the welding operation to an electronic controller for the welding machine;
   b) said controller setting initial parameter values;
   c) performing a trial welding operation using the initial parameter values;
   d) providing weld quality information from the trial welding operation to the controller;
   e) said controller being responsive to the weld quality information to change said initial parameter values for a subsequent trial welding operation;
   f) providing weld quality information from the trial welding operation using the changed parameter values to the controller;
   g) said controller being responsive to said latter weld quality information to further change the parameter values based in part on the weld quality information from all previous trial welding operations and to trial welding operations which do not follow predefined rules-of-thumb to increase a frustration level and to modify the weighting of possible solutions in response to the frustration level.

38. A method of setting parameters for a welding operation on a welding machine comprising the steps of:
   a) providing identifying information concerning the welding operation to an electronic controller for the welding machine;
   b) said controller setting initial parameter values;
   c) providing information concerning the identity of the welding machine to the controller, said controller being responsive to said identity to compare the initial parameter values with preset limits for the identified welding machined;
   d) performing a trial welding operation using the initial parameter values;
   e) providing weld quality information from the trial welding operation to the controller;
   f) said controller being responsive to the weld quality information to change said initial parameter values for a subsequent trial welding operation;
   g) providing weld quality information from the trial welding operation using the changed parameter values to the controller;
   h) said controller being responsive to said latter weld quality information to further change the parameter values based in part on the weld quality information from all previous trial welding operations.

39. A method of setting parameters for a welding operation on a welding machine comprising the steps of:
   a) providing identifying information concerning the welding operation to an electronic controller for the welding machine;
   b) said controller setting initial parameter values;
   c) performing a trial welding operation using the initial parameter values;
   d) providing weld quality information from the trial welding operation to the controller, some of said weld quality information is provided by a human user;
   e) said controller being responsive to the completion of a trial welding operation to prompt the user to provide the weld quality information, and responsive to the weld quality information to change said initial parameter values for a subsequent trial welding operation;
   f) providing weld quality information from the trial welding operation using the changed parameter values to the controller;
   g) said controller being responsive to said latter weld quality information to further change the parameter values based in part on the weld quality information from all previous trial welding operations.

40. The method of setting welding machine parameters as set forth in claim 39 wherein the controller supplies to the user a list of weld quality choices and the user supplies the controller with the weld quality information by selecting an item on said list.

41. A method of setting parameters for a welding operation on a welding machine comprising the steps of:
   a) providing identifying information concerning the welding operation to an electronic controller for the welding machine;
   b) said controller setting initial parameter values;
   c) said controller prompting a human user to initiate a trial weld once the controller has set the parameters for said welds;
   d) performing a trial welding operation using the initial parameter values;
   e) providing weld quality information from the trial welding operation to the controller;
   f) said controller being responsive to the weld quality information to change said initial parameter values for a subsequent trial welding operation;
   g) providing weld quality information from the trial welding operation using the changed parameter values to the controller; and
   h) said controller being responsive to said latter weld quality information to further change the parameter values based in part on the weld quality information from all previous trial welding operations.

42. The method as set forth in claim 39 further including weighting said weld quality information presented to the user for selection.

43. The method as set forth in claim 42 wherein the weighting step includes manually inputting data representing the severity of a defect represented by weld quality information.

44. The method as set forth in claim 42 wherein the weighting step includes using preset weights for weld quality information representing a plurality of different joint defects.

45. The method as set forth in claim 42 wherein the method includes weighting solutions to the joint defects detected.

46. The method as set forth in claim 45 wherein the step of weighting solutions includes a setting a predefined confidence level for each possible solution and a historical confidence level, said historical confidence level being modified during operation.

47. The method as set forth in claim 46 wherein the predefined confidence level and the historical confidence level are weighted unequally.

48. The method as set forth in claim 47 wherein the weighting of the historical confidence level is increased by the system in response to test weld results which do not follow predefined rules-of-thumb.

49. The method of setting welding operation parameters for a welding operation on a welding machine comprising the steps of:
  a) providing identifying information concerning the welding operation to an electronic controller for the welding machine;
  b) said controller setting initial parameter values;
  c) performing a trial welding operation using the initial parameter values;
  d) weighting weld quality information from the trial welding operation;
  e) providing said weighted weld quality information from the trial welding operation to the controller;
  f) said controller being responsive to the weld quality information to change multiple welding operation parameters for at least one subsequent trial welding operation;
  g) weighting weld quality information from the trial welding operation using the changed parameters;
  g) providing said weighted weld quality information from the trial welding operation using the changed parameter values to the controller;
  h) said controller being responsive to said latter weighted weld quality information to further change the parameter values based in part on the weighted weld quality information from all previous trial welding operations.

50. The method as set forth in claim 49 wherein the weld quality information represents a joint defect, and wherein the weighting step includes manually inputting data representing the severity of the joint defect.

51. The method as set forth in claim 49 wherein the weld quality information represents a joint defect, and wherein the weighting step includes setting preset weights for different joint defects.

52. The method as set forth in claim 49 wherein the weld quality information represents a joint defect, and wherein the method includes weighting solutions to the joint defects detected.

53. The method as set forth in claim 52 wherein the weighting solutions step includes setting a predefined confidence level for each possible solution and a historical confidence level, said historical confidence level being modified during operation.

54. The method as set forth in claim 53 wherein the predefined confidence level and the historical confidence level are weighted unequally.

55. The method as set forth in claim 54 wherein the weighting of the historical confidence level is increased by the system in response to test weld results which do not follow predefined rules-of-thumb.

* * * * *